(12) United States Patent  
Henry

(10) Patent No.: US 6,561,304 B1
(45) Date of Patent: May 13, 2003

(54) ROTARY ACTUATOR ASSEMBLY

(75) Inventor: Rassem Ragheb Henry, Clinton Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/677,143

(22) Filed: Oct. 2, 2000

(51) Int. Cl.⁷ ................................................ B62D 5/04
(52) U.S. Cl. ................ 180/402; 280/93.51; 280/93.512; 280/124.146
(58) Field of Search ............................... 180/253, 402, 180/400, 403; 280/771, 93.512, 93.51, 124.146, 124.154, 124.145

(56) References Cited

U.S. PATENT DOCUMENTS

| | | |
|---|---|---|
| 3,741,581 A | 6/1973 | Patrin |
| 4,311,006 A | 1/1982 | Becker |
| 4,487,429 A | 12/1984 | Ruggles |
| 4,513,839 A * | 4/1985 | Nieminski et al. .......... 180/253 |
| 4,716,785 A * | 1/1988 | Godai et al. .................. 74/640 |
| 4,741,409 A | 5/1988 | Westercamp et al. |
| 4,877,098 A | 10/1989 | Asanuma |
| 4,895,216 A * | 1/1990 | Fusimi et al. .............. 180/79.1 |
| 4,972,914 A * | 11/1990 | Asanuma .................... 180/79.1 |
| 5,097,917 A | 3/1992 | Serizwa et al. |
| 5,161,813 A * | 11/1992 | Yamashita et al. ............ 280/96 |
| 5,253,726 A * | 10/1993 | Weyer ......................... 180/132 |
| 5,322,140 A * | 6/1994 | Bussinger .................. 180/65.1 |
| 6,155,543 A * | 12/2000 | Solomund et al. .......... 267/216 |
| 6,206,132 B1 * | 3/2001 | Urbach ........................ 180/402 |
| 6,279,674 B1 * | 8/2001 | Lissel et al. ................ 180/402 |
| 6,343,804 B1 * | 2/2002 | Handke et al. ....... 280/124.145 |

* cited by examiner

Primary Examiner—Avraham Lerner
(74) Attorney, Agent, or Firm—Edmund P. Anderson

(57) ABSTRACT

A rotary actuator for a vehicle having an electric/hydraulic motor that is used to rotate a strut tube. The motor is mounted inside the suspension spring and around the tubular portion of the strut tube. A first shaft receives the output of the motor and transfers it to a gearbox that reduces the speed. A second shaft receives the output of the gearbox. A torque rod is attached to the opposite end of the second shaft and transfers the rotation of the second shaft through a semi-circular slot in the spring seat to a annular member. The annular member is further attached back to the strut tube, thus when the motor is energized, the rotation is transferred through the assembly to the strut tube causing it to rotate and steer the road wheel to which it is attached.

31 Claims, 6 Drawing Sheets

ROTARY ACTUATOR ASSEMBLY

FIELD OF THE INVENTION

This invention relates to a steering system for a motor vehicle. More particularly, the invention relates to a rotary actuator assembly for an automotive strut steer-by-wire assembly.

BACKGROUND OF THE INVENTION

Automotive steering systems which utilize a mechanical linkage arrangement to translate motion from the steering wheel within the vehicle to the road wheels in order to change the direction of the road wheels are well known in the art. Mechanical linkage systems may be hydraulically assisted to make it easier for the driver to steer the automobile. Mechanical systems are time tested and function well however they are expensive due to the large number of components required and they tend to be heavy because of the loads that are experienced during use. Moreover, hydraulic assist systems place an additional load on the engine of the automobile. Weight and load on an engine reduces fuel economy and available power. These are clearly undesirable.

In more recent times, hydraulic assist systems have been replaced by electric assist systems. This reduces both weight and engine load but these systems generally have maintained use of the mechanical linkages and so are still relatively expensive to build and still suffer from the weight of the linkages. In keeping with the persistent quest to increase fuel economy and profitability of automobiles it is desirable to further reduce componentry necessary to a reliable steering system for a motor vehicle.

BRIEF SUMMARY OF THE INVENTION

The present invention is directed to a steering system which alleviates the drawbacks of the prior art by providing a reliable, cost effective and compact steering system which requires no mechanical linkage between the steering wheel of the vehicle and the road wheels of the vehicle. The foundation of the invention is a rotary actuator which is responsive to signals from an automobile steer-by-wire system. The rotary actuator system is configured to fit in a substantially nested relationship with a strut and coil spring assembly wherein the strut is attached to the chassis of a vehicle on one end and the wheel hub at the other end and the coil spring is bounded by a spring stop connected to the chassis proximate the strut attachment thereto on a first end and a spring seat attached to the strut on the other end. The rotary actuator comprises a motor attached to a first shaft which receives high speed output from the motor. The first shaft transfers the high speed motor output to a transmission which may be a gear assembly which transforms the high speed output of the motor to a low speed output. The low speed output is transferred from the gearbox to a second shaft. At least one torque rod is attached to the second shaft and transfers the low speed rotation through an arcuate slot in the spring seat to an annular member to which the torque rod is operably coupled, preferably on an outer diameter of the annular member. The annular member is attached on its inside diameter to the strut tube. The strut tube is directly connected to a road wheel. Generation of an arcuate movement of the torque rod by the motor, gear assembly and shafts causes the strut to rotate and thereby steers the road wheel to which that strut is connected. Preferably two rotary actuators are needed to steer a front-wheel-steer vehicle although it will be understood that if desired a single rotary actuator could be employed and mechanical linkage used to operate the opposite wheel. Moreover, three or four rotary actuators can be employed to operate a four wheel steer-by-wire system allowing all corners of the vehicle to be steered.

DETAILED DESCRIPTION OF THE INVENTION

Figure 1:
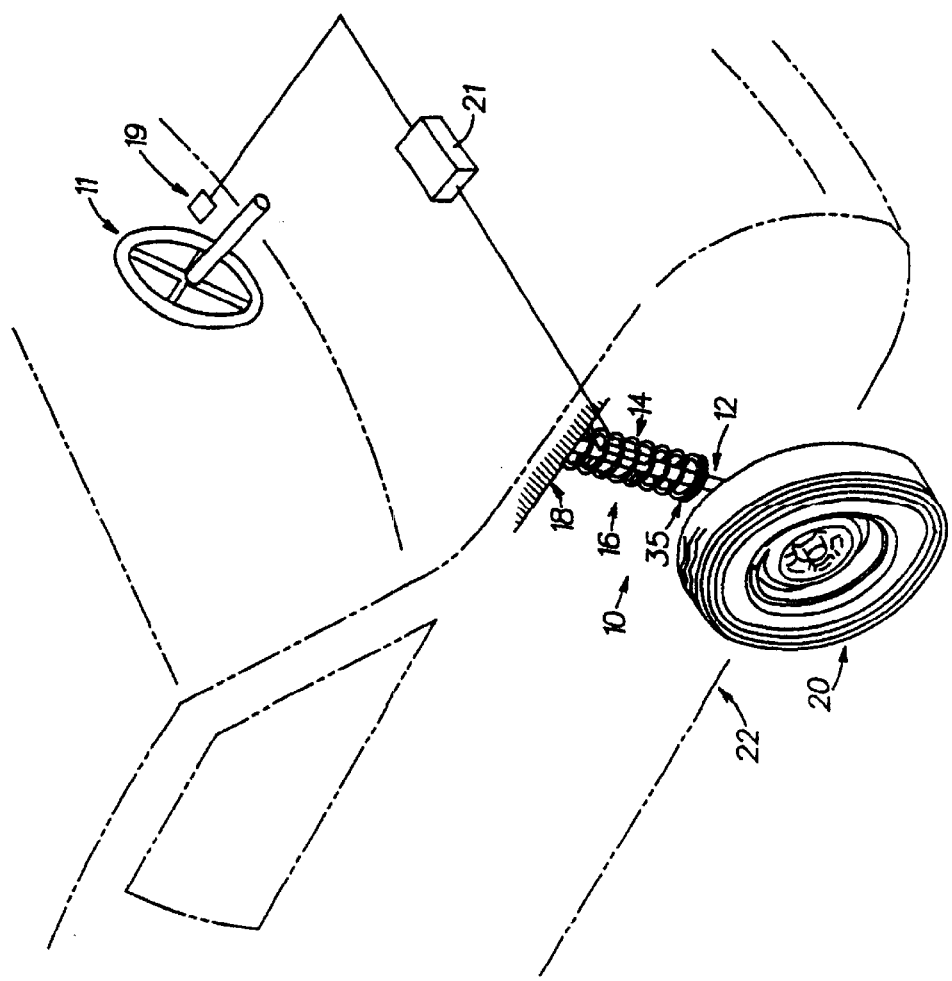
FIG. 1 is a perspective view of an automotive steering assembly in accordance with the present invention.

In the vernacularly known "drive-by-wire" systems, conventional mechanical steering linkage is completely or partially removed. In such systems, movement of the steering wheel 11 is detected by sensors 19 which provide electronic feedback to a computer control system 21. Control system 21 in turn provides signals to actuators 14 which change the direction of the road wheels 20.

Figure 1A:
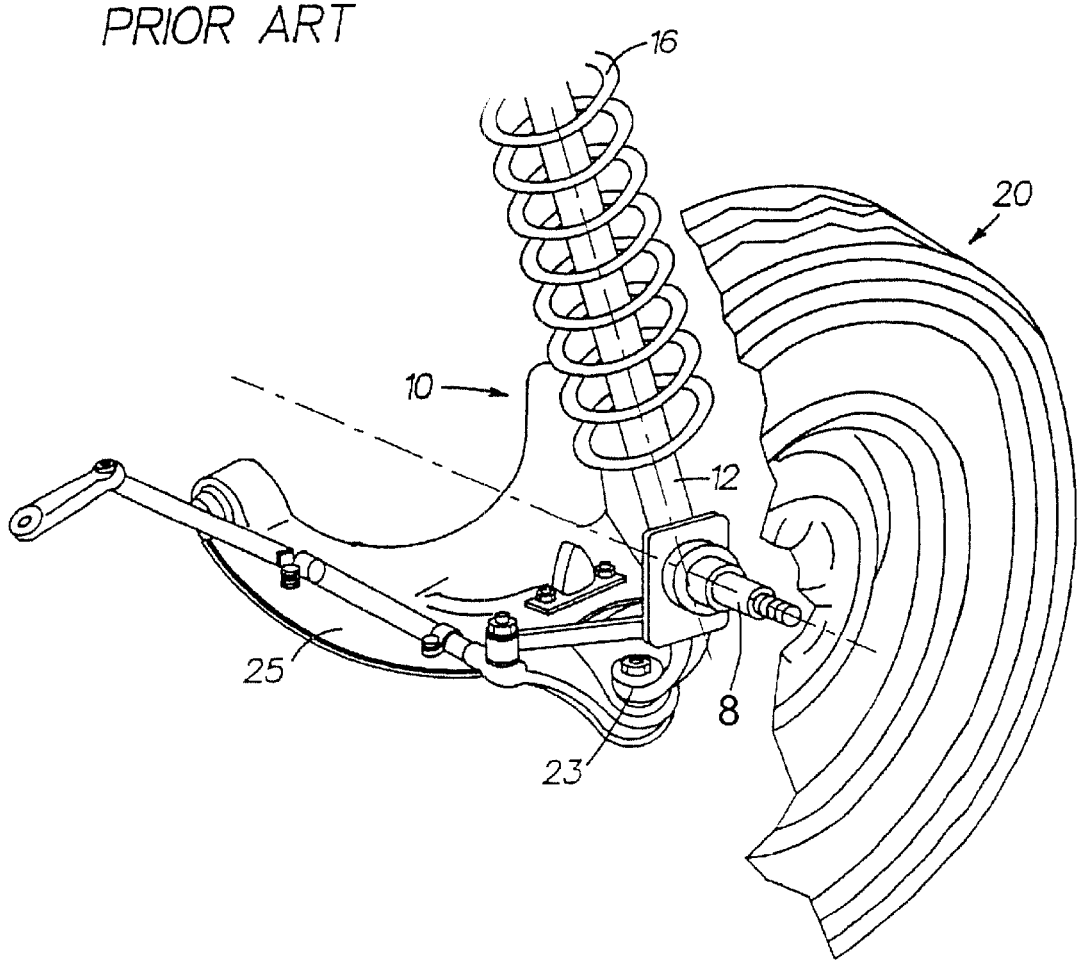
FIG. 1a is a partially cut away perspective view of a prior art strut and control arm assembly.

As shown in FIGS. 1 and 1a, an automobile 22 (shown in broken lines) utilizes a strut assembly 10 to change the direction of the road wheel 20. The strut assembly 10 consists of a strut 12 mounted at one end to the automobile chassis 18. At a lower end of strut assembly 10, strut 12 is mounted pivotally at ball joint 23 to lower control arm 25. The road wheel assembly 20 is mounted to strut 12 through a spindle 8 fixedly mounted to strut 12. A coil spring 16 is mounted between a spring seat 35 of the strut 12 and the chassis 18. To change the direction of the automobile in response to movement of the steering wheel 11, a rotary actuator assembly 14, whose purpose will be made clearer herein, is mounted between an inside diameter of the coil spring 16 and an outside diameter of the strut 12.

Figure 2:
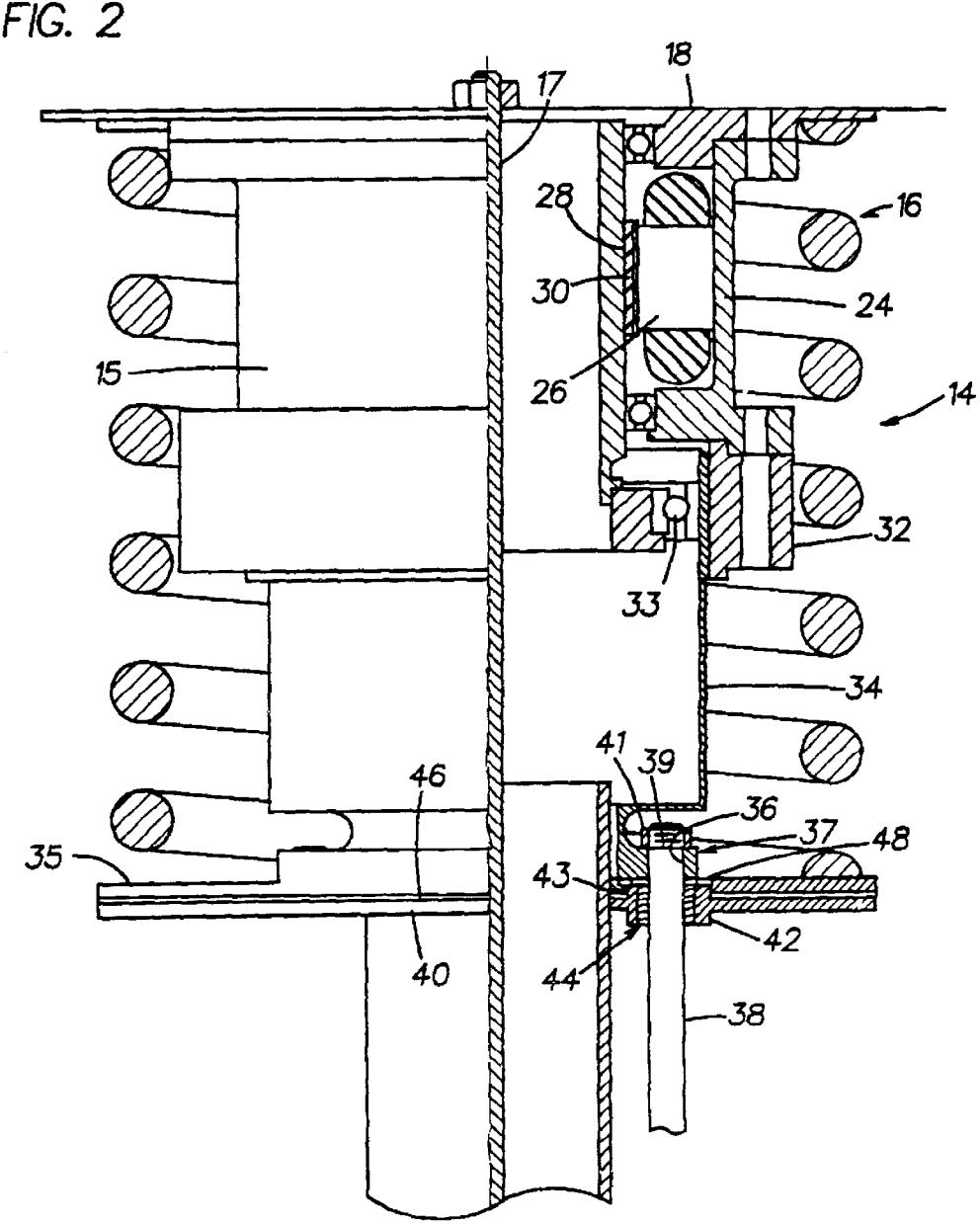
FIG. 2 is a side view partially in section of the steering assembly shown in FIG. 1 wherein the suspension is in a compressed position.

The rotary actuator assembly 14 has a motor 24 mounted to the chassis 18, as shown in FIG. 2. While any suitable type of motor (electrical, hydraulic, pneumatic, etc.) could be used, a permanent magnet brushless dc motor 24 is preferred to provide power for the actuator assembly 14. Brushless dc motors provide the high reliability and low maintenance that is desired in automotive applications. The motor 24 has a permanent magnet 28 attached to a hollow motor shaft 30 which is disposed over the strut tube 15 of the strut 12. The strut 12 has a piston rod 17 which connects the strut tube 15 with the chassis 18. Since the brushless dc motor 24 operates at high speed, a speed reducing transmission or gearbox 32 is desirable to reduce the output of the motor 24 to a lower speed/higher torque to facilitate rotation of the strut 12, and thereby steer the road wheel assembly 20. The speed reducing gearbox 32 is mounted to the motor opposite the chassis 18. The gearbox 32 takes the output of the high speed shaft 30 and transmits it to a lower speed/higher torque shaft or flex-spline 34. While any suitable gearbox is capable of producing the desired changes in output speed, the additional mechanical constraints imposed by the venue in which the device is intended to operate renders preferable a harmonic drive device due to the inherent hollow center portion which accommodates the piston rod 17 of strut 12. It is also possible to employ a cycloidal drive device providing the solid central shaft at one end of such a device is taken into account. A bearing 33 provides support to the flex-spline 34 as it rotates about the strut tube 15. The bearing 33 typically would be of a wave generator type of bearing. The flex-spline 34 has a hole 37 at the end opposite the gearbox 32 which is sized to receive a torque transmitter which is preferably a torque rod 38. It is important to recognize that a torque transmitter is an arrangement allowing linear movement of the strut while also facilitating transmission of rotational movement from the gear assembly to the strut tube. Many different arrangements are possible without deporting from the scope of the invention. One preferred embodiment being a torque rod 38 as illustrated. The torque rod 38 has a threaded portion 39, which accepts a nut 41 to capture the torque rod 38 to the flex-spline 34. Although any number of torque rods 38 could be used in the system depending on the requirements of the application, only one torque rod 38 is shown for purposes of clarity.

A small clearance 48 is needed between the flex-spline bottom surface 43 and the spring seat 35 when the spring 16 is in its fully compressed or jounced position. This clearance 48 prevents the spring seat 35 from contacting the flex-spline 34 during operation allowing the flex-spline to rotate freely under all conditions. The spring seat 35 along its outer diameter supports the spring 16 and is mounted to the strut tube 15 along its inner diameter. At least one arcuate slot 36 is formed in the spring seat 35 to allow the torque rod(s) 38 to pass through and attach to an annular member 40. If more than one torque rod 38 is used, the additional torque rods may pass through a single arcuate slot, or multiple arcuate slots may be provided. A linear bearing and torque rod guide 42 provide the interface between the annular member 40 and the torque rod 38. The linear bearing 44 allows the torque rod to move through annular member 40 as will be further described herein. The torque rod guide 42 captures the bearing 44 and due to the length of the guide 42, any twisting or angling of the torque rod 38 is minimized. The annular member 40 is attached at its inner diameter to the strut tube 15. As will be described further herein, the annular member 40 is fixedly attached to and rotates the strut tube 15 to provide steering control in response to movement by the driver of the automobile steering wheel 11. The spring seat 35 is not fixedly connected to strut tube 15 in order that the strut tube 15 is able to rotate relative to the vehicle chassis to which the spring is attached. A bearing 46 is captured between the annular member 40 and the spring seat 35 to allow the annular member to rotate relative to the spring seat with a low coefficient of friction. The bearing is preferably composed of any suitable low friction material such as teflon. Alternatively, any thrust, ball or roller bearing arrangement may be employed with similar results obtained.

Figure 3:
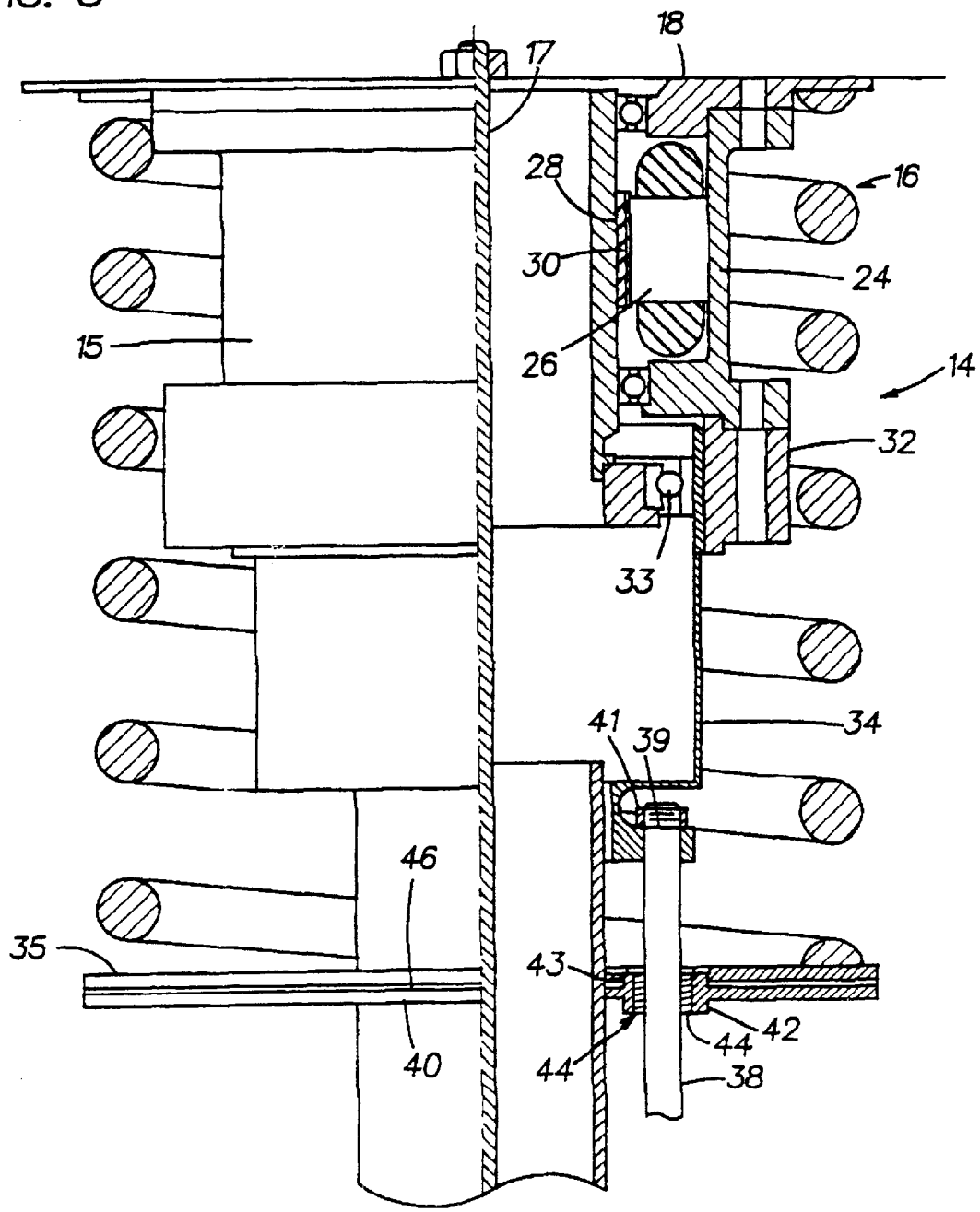
FIG. 3 is a side view partially in section of the steering assembly shown in FIG. 1 wherein the suspension is in an extended position.

During operation, the strut assembly 12 will move due to irregularities in the road surface where the vehicle is being driven. The strut assembly 12 moves between a jounced position, where the suspension spring 16 is compressed, and a rebound position where the spring 16 is fully extended. Accordingly, the actuator assembly 14 must be able to operate under both conditions and during the transition between the two. To accomplish this, provisions of the invention include placement of components and accommodation of the changing operating space. The actuator assembly is mounted within the coil spring 16 and mounted to the chassis 18. In response to movement of the automobile steering wheel 11, the motor 24 energizes to rotate the high speed shaft 30. The gear assembly 32 receives the input from the shaft 30 and reduces the speed and increases the torque before outputting to the low speed shaft or flex-spline 34. The flex-spline 34 in turn moves the torque rod 38 in an arc about the centerline of the strut 12. In a typical automotive application, the torque rod 38 would be rotated about 70 degrees from full right to full left steering. The torque rod 38 moves in the arcuate slot 36 to rotate the annular member 40 and the strut tube 15. Since the torque rod 38 is captured in a linear bearing 44, the torque rod 38 is free to move rotationally or in the vertical direction (as viewed in FIG. 2) independent of the annular member 40. Because of the facility of the torque rod 38 to slide through linear bearing 44, the device of the invention (first embodiment) maintains functionality during compression of the spring members of the vehicle. The torque rod simply extends farther through annular member 40. The compressed position is shown in FIG. 2 and the extended position is shown in FIG. 3.

Figure 4:
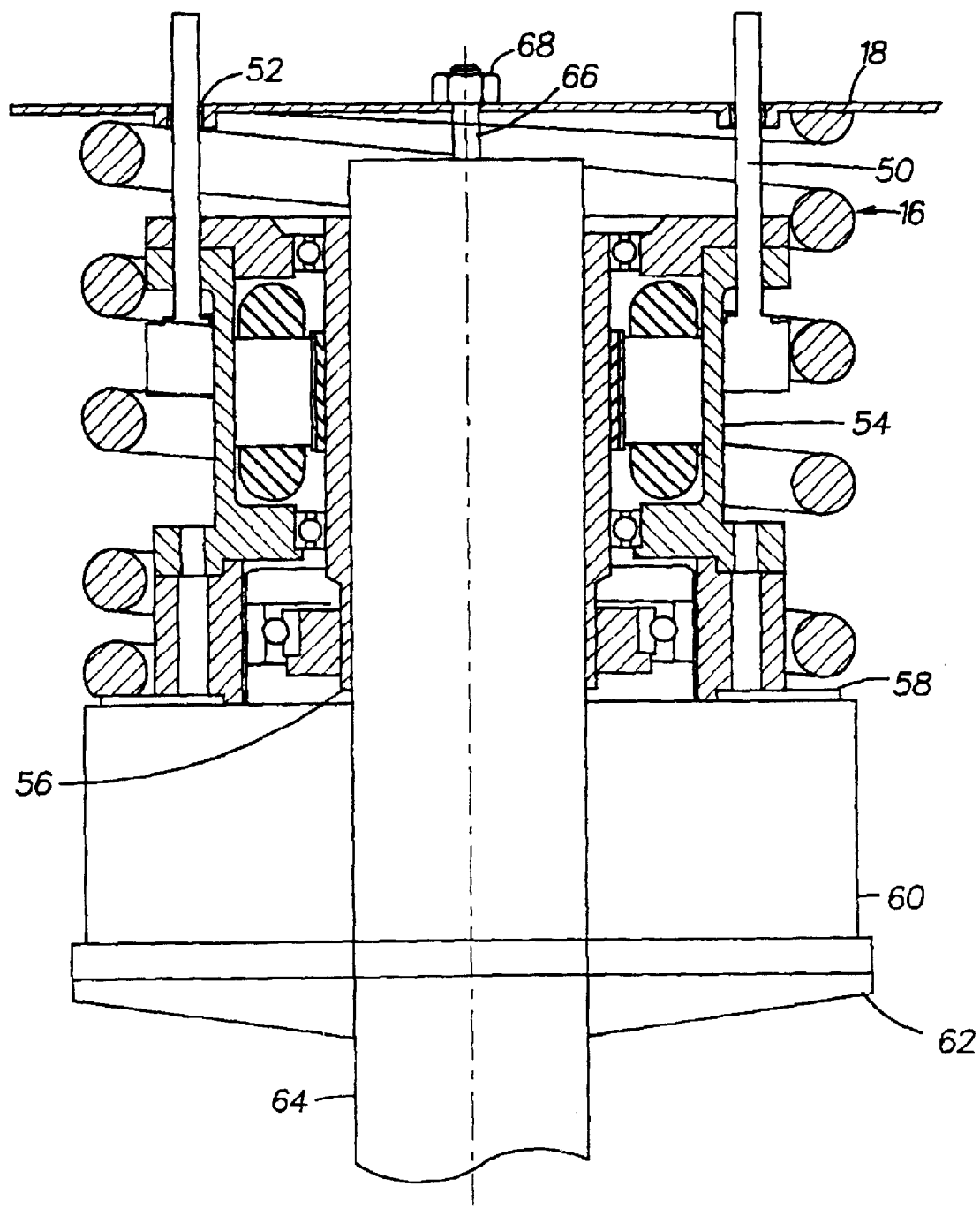
FIG. 4 is a side view partially in section of the steering assembly alternate embodiment in an intermediate position.

In an alternate embodiment of the present invention, a motor 54 is mounted to at least one reaction arm 50 which mounts to the chassis 18 by a linear bearing 52. As shown in FIG. 4, the motor 54 and reaction arm 50 are located between the strut tube 64 and the coil spring 16. The motor mounting arrangement is such that the motor 54 is allowed to slide vertically (as oriented in FIG. 4) as the suspension system moves between the compressed and extended positions. For the same reasons stated above, the motor 54 will typically be a brushless-dc motor type, however, other types of motors may be used as well. The motor 54 has a hollow shaft 56 that is sized to fit over the strut tube 64. The hollow shaft 56 rotates at high speeds when the motor is energized in response to a signal from the control system 21. A gear assembly 60 is connected to one end of the shaft 56. The gear assembly receives its input from the shaft 56 and reduces this speed down to a level that can be used to rotate the strut tube 64 while multiplying the torque to overcome the load torque. Since the gear assembly 60 is mounted to the motor 54, the gear assembly 60 is free to move along with the motor 54 when the suspension system moves between the extended and compressed positions. The gear assembly 60 outputs the reduced speed to a low speed shaft 62. Since the shaft 62 connects along its inner diameter to the strut tube 64, the strut tube 64 is rotated when a signal from the steering control system is received causing the motor and gear assembly to operate.

Figure 5:
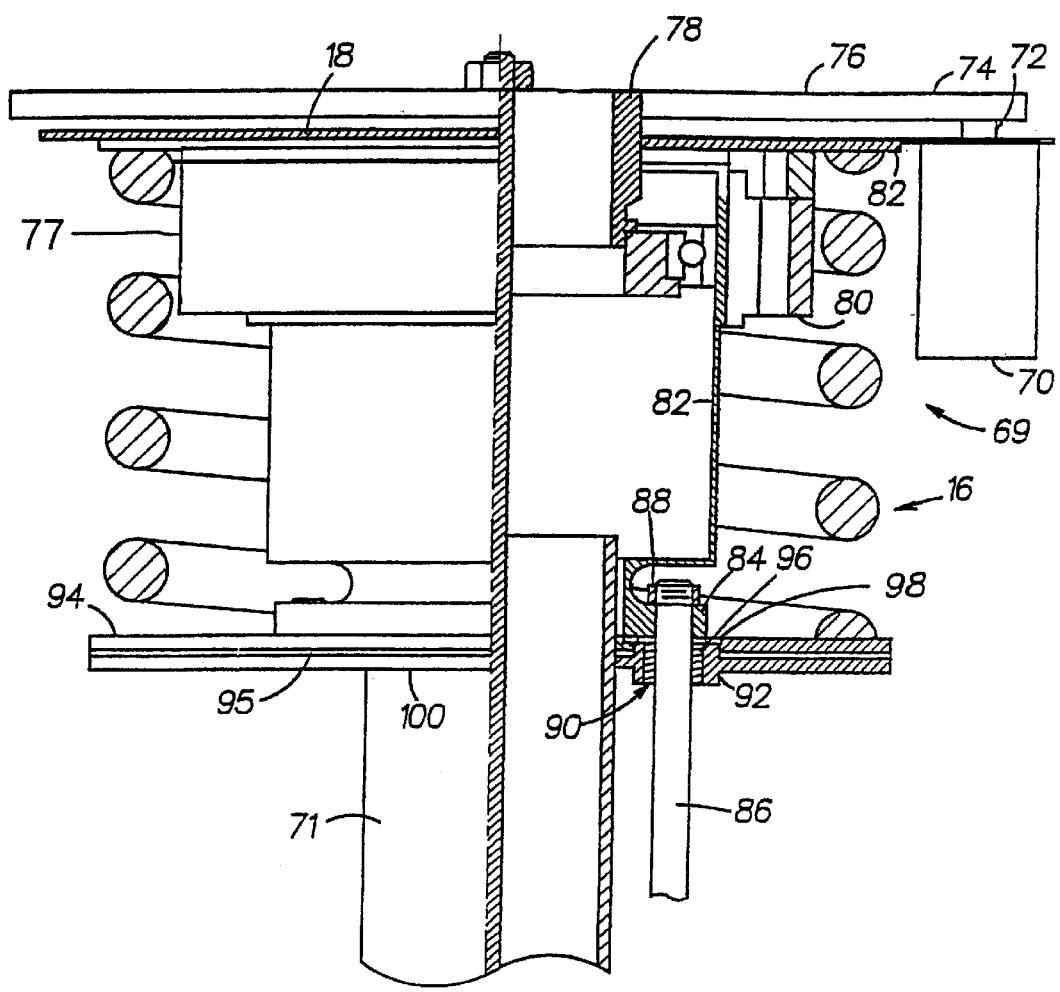
FIG. 5 is a side view partially in section of the steering assembly second alternate embodiment in a compressed position.

Another alternate embodiment of the invention is illustrated in FIG. 5. The motor 70 is mounted to the chassis 18 outside of the suspension spring 16. A motor shaft 72 extends from the motor 70 through the chassis 18. A pinion 74 is mounted to the end of the motor shaft on the inside of the chassis 18. A shaft 77 mounted to the chassis 18 supports a transfer gear 76 which connects the pinion 74 and a high speed gear assembly input gear 78. The mating point of the input gear 78 and the transfer gear 76 is radially inward from the inner diameter of the coil spring 16. The input gear 78 extends back through the chassis 18 mates with a gear assembly 80. The input gear 78 is supported by a bearing 80. The gear assembly 80 is mounted to the chassis 18, and is positioned between the coil spring 16 and the strut tube 71.

In a similar arrangement to the first embodiment described above, the gear assembly 80 outputs to a low speed gear or flex-spline 82. The flex-spline 82 has hole 84 at the end opposite the gear assembly 80 which is sized to receive a torque rod 86. The torque rod 86 has a threaded portion 87, which accepts a nut 88 to capture the torque rod 86 to the flex-spline 82. Any number of torque rods 86 could be used in the system depending on the requirements of the application, only one torque rod 86 is shown in FIG. 5 for purposes of clarity.

A small clearance 98 is needed between the flex-spline bottom surface 85 and the spring seat 94 when the spring 16 is in its compressed or jounced position. The spring seat 94 supports the spring 16 along its outer diameter and is mounted to the lower strut tube 71 along its inner diameter. At least one arcuate slot 96 is formed in the spring seat 94 to allow the torque rod(s) 86 to pass through and attach to a rotating annular member 100 which is fixedly attached to strut tube 71. A linear bearing 90 and torque rod guide 92 provide the interface between the annular member 100 and the torque rod 86. The linear bearing 90 allows the torque rod 86 to move as the suspension moves between an extended and compressed position. The torque rod guide 92 captures the bearing 90 and minimizes twisting or angling of the torque rod 86. The annular member 100 is attached at its inner diameter to the lower strut tube 71. The annular member 100 rotates the strut tube 71 to provide steering control in response to movement by the driver of the automobile steering wheel 11. A bearing 95 is captured between the annular member 100 and the spring seat 94 to facilitate smooth and easy rotational relative movement between annular member 100 and spring seat 94. The bearing 95 is preferably made from a low friction material such as teflon.

During operation, and in response to an input provided by a vehicle operator, the motor 70 rotates the pinion 74 at high speed. The pinion 74 transfers the torque to the gear 76 which in turn transfers it to the input gear 78. The input gear transfers the torque generated by the motor 70 back through the chassis 18 and outputs the torque to the gear assembly 80. The gear assembly 80 receives the input and reduces the speed and outputs it to the flex-spline 82. The torque rod 86 rotates with the flex-spline 82 and thus rotates the strut tube 71 as was explained above. The slidable mounting of the torque rod 86 in the linear bearing 90 allows the actuator assembly 69 to operate as the strut tube 71 moves between the compressed and extended positions.

The embodiments described herein have referred to the use of a rotary actuator on only one of the road wheels. It should be appreciated that the actuators described above can be installed at one or more road wheels as required by a intended application. This flexibility allows the automobile to have one (or more) independent steering actuators which can rotate the road wheels at slightly different angles allowing the automobile to turn about a common center or to compensate for various other road conditions or purposeful variations.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the appended claims.

What claimed is:

1. A rotary actuator for a vehicle comprising:
    a motor;
    a strut having a tubular portion;
    a first shaft attached to said motor;
    a gearbox attached to said first shaft;
    a second shaft attached to said gearbox; and,
    at least one torque rod connected to said second shaft and positioned exteriorly of said tubular portion of said strut, wherein the at least one torque rod is configured to rotationally drive the strut tube while allowing linear movement of the strut tube.

2. The rotary actuator of claim 1 wherein said motor is attached to a chassis of said vehicle.

3. The rotary actuator of claim 1 wherein said motor is attached to said strut.

4. The rotary actuator of claim 1 wherein the at least one torque rod comprises a plurality of torque rods.

5. The rotary actuator of claim 1 further comprising a piston within the tubular portion of the strut.

6. A rotary actuator for a vehicle comprising:
    a strut having a centerline;
    a first shaft mounted around said strut;
    a second shaft mounted around said strut and connected to said first shaft;
    a transmission having an input end and an output end and being connected on said input end to said first shaft and on said output end to said second shaft;
    a connector including a torque rod connecting said second shaft to said strut, wherein the torque rod moves in an arc about the centerline of the strut; and
    a rotator to rotate said first shaft.

7. A rotary actuator as in claim 6 wherein said rotator is an electric motor.

8. A rotary actuator as in claim 7 wherein said transmission is a gearbox.

9. A rotary actuator as in claim 6 wherein said rotator is an hydraulic motor.

10. A rotary actuator as in claim 6 wherein said rotator is a pneumatic motor.

11. A rotary actuator as in claim 6 wherein said connector further comprises an annular member, said annular member being attached to said strut along an inside diameter thereof and to said torque rod along an outside diameter thereof.

12. A rotary actuator as in claim 11 wherein said second shaft is supported by a bearing.

13. A rotary actuator as in claim 12 wherein said bearing is a wave generator type bearing.

14. A rotary actuator as in claim 13 wherein said electric motor is attached to said first shaft by at least one gear.

15. The rotary actuator as in claim 6 wherein the torque rod is configured to rotationally drive said strut while allowing linear movement of the strut.

16. The rotary actuator as in claim 6 further comprising a plurality of torque rods.

17. The rotary actuator as in claim 6 further comprising a piston within the strut.

18. A steering actuator for a strut suspended vehicle, said strut including a coil spring disposed about a strut piston rod and in biased communication with a spring seat and a strut tube, said actuator comprising:
    a motor;
    a gear assembly operably connected to said motor and having an output;
    at least one torque rod, separate from the strut piston rod, connected to said output and connected to said strut tube, said torque rod translating a moment to said strut tube correlated to a movement of said output of said gear assembly.

19. A steering actuator as claimed in claim 18 wherein said motor and gear assembly are housed within a hollow defined by said coil spring.

20. A steering actuator as claimed in claim 18 wherein said spring seat includes at least one arcuate opening for through passage of said at least one torque rod.

21. A steering actuator as claimed in claim 18 wherein said at least one torque rod is connected to said strut tube by an annular member mounted to said strut tube.

22. A steering actuator as claimed in claim 18 herein said annular member further includes a linear bearing to receive said at least one torque rod.

23. A rotary actuator for a vehicle comprising:
   a motor;
   a strut having a tubular portion;
   a spring seat attached to said tubular portion of said strut;
   a spring positioned between said spring seat and a chassis or said vehicle;
   a first shaft attached to said motor;
   a gearbox attached to said first shaft;
   a second shaft attached to said gearbox;
   at least one torque rod connected to said second shaft and positioned exteriorly of said tubular portion of said strut; and,
   an annular member, said annular member connecting said at least one torque rod and said tubular portion of said strut.

24. The rotary actuator of claim 23 further comprising a bearing positioned between said spring scat and said annular member.

25. The rotary actuator of claim 24 wherein said first and second shafts are hollow and said strut is located within said first and second shafts.

26. The rotary actuator of claim 23 wherein said first and second shafts are located within a hollow defined by said spring.

27. The rotary actuator of claim 23 wherein said spring seat has at least one arcuate slot and said at least one torque rod is positioned within said at least one arcuate slot.

28. The rotary actuator of claim 23 further comprising a linear bearing attached to said annular member and supporting said at least one torque rod.

29. The rotary actuator of claim 23 wherein said motor is located within a hollow defined by said spring.

30. The rotary actuator of claim 23 wherein the at least one torque rod comprises a plurality of torque rods.

31. A rotary actuator for a vehicle comprising:
   a strut having a tubular portion;
   a motor attached to said strut;
   a first shaft attached to said motor;
   a gearbox attached to said first shaft;
   a second shaft attached to said gearbox; and,
   at least one torque rod connected to said second shaft and positioned exteriorly of said tubular portion of said strut.

* * * * *